(12) United States Patent
Robert

(10) Patent No.: US 7,496,764 B2
(45) Date of Patent: Feb. 24, 2009

(54) DATA TRANSMISSION METHOD BETWEEN A LOCAL SERVER AND LOCAL PERIPHERALS

(75) Inventor: Arnaud Robert, Berne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 410 days.

(21) Appl. No.: 10/233,612

(22) Filed: Sep. 4, 2002

(65) Prior Publication Data

US 2003/0051149 A1 Mar. 13, 2003

(30) Foreign Application Priority Data

Sep. 12, 2001 (CH) .................................. 1682/01

(51) Int. Cl.
*H04L 9/32* (2006.01)
*H04L 9/00* (2006.01)
*G06F 7/04* (2006.01)

(52) U.S. Cl. ................... 713/189; 713/182; 713/183; 713/184; 713/185; 713/186; 726/3; 726/4; 726/5; 726/6; 380/30; 380/232

(58) Field of Classification Search .......... 726/3–6, 726/9, 16–21, 27–30; 713/182–186, 168–176, 713/193–194, 189; 380/30, 232
See application file for complete search history.

(56) References Cited

U.S. PATENT DOCUMENTS

| | | | | |
|---|---|---|---|---|
| 6,002,687 | A * | 12/1999 | Magee et al. ............... | 370/394 |
| 6,178,242 | B1 * | 1/2001 | Tsuria ....................... | 380/201 |
| 6,581,160 | B1 | 6/2003 | Harada et al. | |
| 6,850,914 | B1 | 2/2005 | Harada et al. | |
| 6,892,306 | B1 * | 5/2005 | En-Seung et al. ........... | 713/193 |
| 6,944,734 | B2 * | 9/2005 | Anzai et al. ................ | 711/163 |
| 2002/0138377 | A1 * | 9/2002 | Weber ....................... | 705/32 |

FOREIGN PATENT DOCUMENTS

EP 0969665 1/2000

(Continued)

OTHER PUBLICATIONS

International Search Report, CH 16822001, Jan. 24, 2002.

(Continued)

*Primary Examiner*—Longbit Chai
(74) *Attorney, Agent, or Firm*—Harness, Dickey & Pierce, P.L.C.

(57) ABSTRACT

Example embodiments relate to a method of transmitting encrypted data between a local server connected to one or several local peripherals. The local server may include a security device in charge of acquiring a first right of use of the data. The method may include transmitting the encrypted data from the local server towards a peripheral, extracting from the first right a second right corresponding to the part necessary for the decryption of the data in the peripherals, encrypting by the security module the second right by a pairing key specific to the couple formed by the security module of the local server and the security module of the peripheral, transmitting the encrypted second right to the local peripheral, decrypting with the help of the pairing key the second right by the security device of the peripheral, and decrypting by the peripheral the data encrypted by the second right.

5 Claims, 1 Drawing Sheet

FOREIGN PATENT DOCUMENTS

Figure 1:
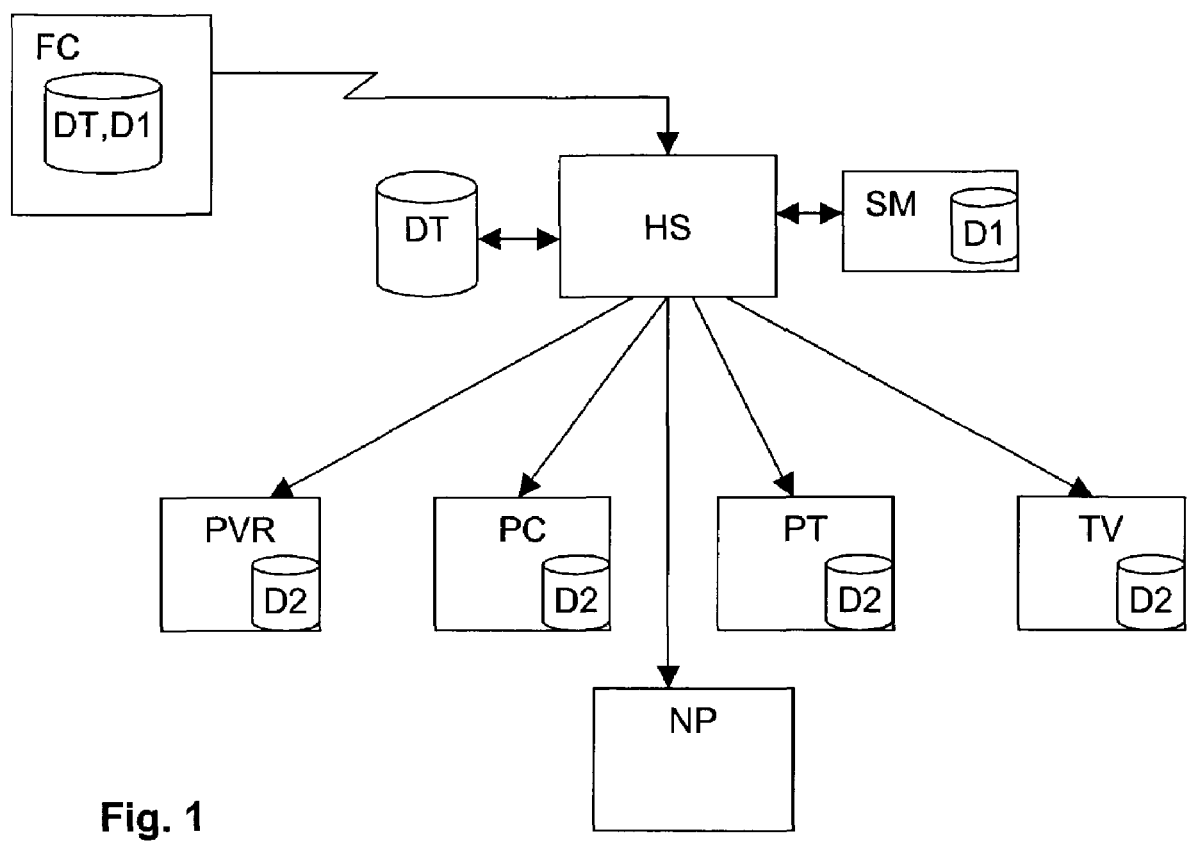

| | | |
|---|---|---|
| EP | 0977438 | 2/2000 |
| JP | A-2000-004431 | 1/2000 |
| JP | A-2000-349725 | 12/2000 |
| JP | A-2001-166996 | 6/2001 |
| JP | A-2001-215974 | 8/2001 |
| WO | 00-13412 | 3/2000 |
| WO | WO 00/13136 | 3/2000 |
| WO | 01-50225 | 7/2001 |
| WO | 01-61680 | 8/2001 |

OTHER PUBLICATIONS

English language Translation of IPER.

English Translation of Notifications of Reasons for Refusal for co-pending Japanese Application No. 2003-528008 dated Aug. 26, 2008.

Chiharu Kagami et al., *An Autonomous Capsule for Content Usage Management*, The Special Interest Group Notes of IPSJ 2000-CSEC-8-18, Information Processing Society of Japan, Apr. 14, 2000, vol. 2000, No. 30, pp. 99-104.

* cited by examiner

DATA TRANSMISSION METHOD BETWEEN A LOCAL SERVER AND LOCAL PERIPHERALS

The present invention belongs to the field of information distribution in electronic form, particularly in the case where this information is sent with conditions of use.

The information can be of several types, such as the audio/video, musical, programme, or game type.

This information is transmitted in encrypted form in order to control the transmission. It can also be downloaded from the Internet or be available on a portable support such as CD-ROM or DVD.

The problem that the present invention examines concerns the transmission of a decryption key or keys of this information.

According to a known way, particularly in the field of transmission of video contents, the key or keys are encrypted by a secret key contained in a security unit reputed inviolable. Thus, the information is received by the multimedia unit that wants to use it, to which is connected the security unit. The multimedia unit transfers to the security unit the message containing the key related to the information. The latter verifies that the owner of the security unit has the rights for decrypting the information.

If this is the case, this security unit decrypts the key and returns it to the multimedia unit so that the latter decrypts the information.

This method satisfies a use of the information or data in the multimedia unit such as in a pay television receiver. Once in plaintext, the data are viewed by the television.

This method is not adapted to the use of these same data by domestic peripherals. By domestic peripherals we understand all the peripherals connected to the multimedia unit in a restricted geographical limit such as a home. These peripherals can be a personal computer, a digital video recorder, a palmtop, or another MP3 recorder, a mobile phone or another mobile multimedia reading system.

In this configuration, the multimedia unit works as a local server for the different peripherals, and the problem arises when we have to transfer the encrypted or decrypted data from this unit to one of the peripherals.

According to the example described above, this function is simply not allowed as it opens the path to a transmission to other users without the supplier of the data being able to control the access.

According to another layout adopted in the frame of the DRM (Digital Rights Management) concept, the transmission between peripherals is carried out in encrypted form and a programme is in charge of the decryption. The documents WO01/50225 and WO00/13412 describe such a process: to obtain the right to decrypt the data, the user must request the supplier for a licence, which licence is accompanied by a decryption key. With this licence, the user accesses a right of use according to the modalities defined in the licence, generally a right of access at wish for a private use on the different domestic peripherals.

Of these two approaches, one allows abusive transmissions of a content out of the domestic environment, and the other is too restrictive because it prevents any use outside of the central multimedia unit.

The objective of the present invention is to allow the domestic transmission of conditional access data without limitation of the type of terminal that is used, and at the same time guaranteeing that this transmission will not be able to go beyond the limit of the using or the belonging place of the peripherals.

This objective is achieved by a transmission method of encrypted data between a local server connected to one or several local peripherals, this local server comprising security means in charge of acquiring a first right of use of these data, characterised in that it consists in:

transmitting the encrypted data from the local server to a peripheral, extracting from the first right a second right corresponding to the part necessary for the decryption of the data in the peripherals, encrypting by the security module the second right by means of a pairing key specific to the couple formed by the security module of the local server and the security module of the peripheral, transmitting this second right encrypted to the local peripheral, decrypting with the help of the pairing key the second right with the security means of the peripheral, decrypting by the peripheral of the encrypted data by the second right.

This method takes place in two steps. In a first step, the local server accesses the service of the supplier of the data to obtain the right of use of the data. There exist numerous solutions in this objective, for example, the purchase on the Internet by means of a credit card or the pay television. In return, the supplier sends a message in encrypted form containing the decryption key of the data. The right of decryption can also be supplied in the form of a decryption and viewing programme. This exchange is carried out advantageously by a protocol using an asymmetric key, allowing to ensure that we transmit the message only to this single user.

This message is transmitted to the security module (for example a smart card) in charge of decrypting this message and of extracting the key (or the decryption programme). This key will be used to decrypt the data for their use on the local server.

The concept of key can be replaced by the concept of operating software. In fact, the data are useless without the programme capable of starting them up. In the case where the data would represent a video, the operating software will be the viewing programme.

During the use of the data in a local peripheral, the encrypted data are transferred to this peripheral. According to the method of the invention, this peripheral also comprises a security module that may have several forms: it can consist of a smart card or a chip directly integrated inside the peripheral or of a software solution.

The control information such as the decryption key or the decryption programme are transmitted in encrypted form to the several peripherals connected to the local server. This encryption is carried out by a pairing key, that is, a key that is unique and specific to the couple formed by the security module of the local server and the security module of the peripheral.

Thus, only the considered peripheral will be able to recognise the control information necessary for the operating of the data. This information is processed by the security module of the peripheral that allows the viewing of the video emission or of the game previously acquired from the supplier.

A characteristic of the invention is hence to allow the secured purchase of data and their operation without limit of the type of peripheral considered as long as they are included in the definition of "domestic". The right acquired in a classical way is thus transferred to these peripherals, at the same time controlling their transmission thanks to the pairing. The pairing method is described in the document WO 99/57901 and consists in generating a unique encryption key between the security module of the local server and the security module of the peripheral during an initialisation phase. This key is memorised on both sides and is used for the transfers of data.

This pairing key could also be a session key, which is generated on request based on stored pairing key (symmetric), or key pair (asymmetric). These pairing keys are unique and constant for the set formed by the security module of the local server and the security module of the peripheral. When the communication between the local server and a peripheral is initiated, the pairing key (or keys) is used either to encrypt and decrypt the data flow or to generate a session key which is unique for the set connected together but not constant.

If one apparatus wants to communicate with the local server, it must necessarily pass through an initialisation phase, during which are carried out controls in terms of quantity and of type of apparatus.

The security means of the local server are in charge of administering the pairing with each peripheral. To avoid that all the neighbourhood of a user is considered as "domestic", the number of paired peripherals will be limited. We can also imagine a limitation of the type of peripheral, for example authorising only one personal computer.

It may occur that one of the peripherals does not contain a security module and that the exchange of rights in encrypted form cannot be performed. This is the case for example of a portable terminal having a small sized screen. In this case, the local server is authorised to transmit in plain text the data in a degraded form. For example, a video transmission will see its resolution reduced, but enough to allow the portable terminal to view it with its screen in a low resolution mode. The interception of such a transmission by a third person does not represent a great danger of broadcasting because the content has not a high added value.

In the case of a musical or video content, this degradation can be carried out either qualitatively or quantitatively, for example by only transmitting a part of the content.

According to a mode of realisation of this embodiment, the right of use of these data is different than in the case where the data are transmitted in encrypted form. This right can be in the form of another decryption key (or another decryption software) that only authorises the partial decryption of the data, for example one frame of every two for a video signal.

In another case, the peripheral does not contain a security module such as defined above, but carries out the security operations (decryption, storage of the rights and keys) in a software way. This type of peripheral can be a mobile telephone for example and will be classified in a different category whose use of the transmitted data may know certain restrictions.

According to a particular embodiment of the invention, the supplier of the content associates a condition of transmission to the transmitted right. This condition determines in what measure this right can be transmitted to the peripherals.

According to one example of use of this condition, the following categories are foreseen:

A category: no transmission of the right is authorised,

B category: the transmission of the right is only authorised if the number of paired peripherals is less than a threshold b (5 for example), C category: the transmission of the right is only authorised if the number of paired peripherals is less than a threshold c (10 for example)

D category: the transmission of the right is only authorised as long as there is only one peripheral per type of peripheral (thus we prevent for example the transmission to several MP3 readers or to several numerical video recorders)

E category: the transmission in plain text, even in degraded form, is not authorised, F category: the transmission is only authorised to peripherals containing a security module (cryptographic processor).

This list of categories is not comprehensive and can also be combined. It is possible to integrate the notion of a maximum number of transmissions to the peripherals.

This allows the supplier to determine the policy he/she desires to follow regarding domestic transmission, even to practice different prices according to the chosen category.

The invention will be better understood with the help of the following detailed description which makes reference to the annexed figure, which is given as a nonlimiting example, and that describes the structure in which the method of the invention is implemented:

In this FIGURE, a supplier of content FC offers the data DT. According to the example represented here, the transmission is carried out by Internet to a local server HS. The latter stores locally the data DT for their use.

The acquisition of the right of use D1 of the data DT can be done at the same time as the downloading of the data. It can also be done in a second step, even from another supplier. In fact, the supplier of the data DT can merely be an intermediary and it is necessary to address the holder of the rights for the acquisition of the right of use.

Once the purchase procedures are carried out, the right D1 is kept in the security module SM of the local server HS. This right contains the indications of the origin of the data, the conditions of use such as described above. In order to prevent any movement from the security module SM towards another local server HS, a pairing mechanism between the security module SM and the local server HS is applied. The considered security module SM can now only communicate with one local server, the one that has been initialised with the module SM.

According to the illustrated example, the local server HS is connected with a digital video recorder DVR, a personal computer PC, a pocket computer (PALM-TOP), and a television TV. Each of these peripherals is paired with the local server HS and thus has a specific encryption key. The electronic notepad NP does not have such a module and the transmission of data DT is only carried out in plain text, but in a degraded quality mode.

During the use of the data in a peripheral, the local server HS, more precisely the security module SM, transmits the right D2 that represents the part necessary for the decryption of the data DT on the peripheral. This right is stored in the security means of the peripherals.

When the data DT and the right D2 are inside the peripheral, it is possible for the latter to use said data inside the limits depending on the content and the using rules. For example, a program paid once can be watched three times. The right received and recorded allows that a purchase of a program involves a maximal number of visualisations fixed at three. The operation of decryption of the data DT by the peripheral can be performed by the peripheral itself or by the security means of the peripheral, according to the chosen implementation.

According to an embodiment of the invention, the limits of use transmitted by the supplier FC to the local server HS, are reported to the peripheral.

When the case is a number of uses by the peripheral, this information contained in the right D2 is processed by the security module of the peripheral.

If the number of uses is defined, whichever the type of peripheral, the right D2 contains the right of one use, each new use having necessarily to be requested to the security module SM of the local server HS that is in charge of the global registration, that is, all the peripherals involved.

According to an embodiment of the invention, the pairing between the local server and the peripherals is performed by a unique key that is common to all the peripherals. The unique pairing key contained in the local server is transmitted during each initialisation with a new peripheral.

The invention claimed is:

1. A method for transmitting encrypted data (DT) between a local server (HS) connected to one or several local peripherals, the peripherals having a security module and able to process a plurality of right messages issued by the local server (HS) encrypted data (DT), said local server (HS) includes a security module (SM) in charge of acquiring a right message including a decryption key relative to the encrypted data (DT), first access conditions relating to the local server and second access conditions relating to a peripheral, the method comprising:

transmitting the encrypted data (DT) of the local server (HS) towards a the peripheral, extracting from the right message the second access conditions corresponding to the decryption's condition of the encrypted data (DT) part necessary for the decryption of the data (DT) in the peripherals, encrypting by the local server's security module (SM), a second right message including the second access conditions and the decryption key, by a pairing key specific to the couple formed by the security module of the local server and the security module of the peripheral, wherein the first access condition comprises conditions of transmission towards the peripherals, and the security module of the local server restrains the transmission of the second right message depending on the first access conditions, transmitting the encrypted second right message to the local peripheral, decrypting with the help of the pairing key, the second message with the security device of the peripheral, and applying the second access conditions by the peripheral's security module, and if allowed, decrypting the encrypted data (DT) received by the peripheral by the decryption key.

2. A transmission method of encrypted data (DT) according to claim 1, wherein the right access conditions is an operating software of the data (DT).

3. A transmission method of encrypted data (DT) according to claim 1.

4. A transmission method of encrypted data (DT) according to claim 1.

5. A transmission method of encrypted data (DT) according to claim 1.

* * * * *